United States Patent [19]

Morrison

[11] 3,856,872

[45] Dec. 24, 1974

[54] XYLENE ISOMERIZATION

[75] Inventor: Roger A. Morrison, Woodbury, N.J.

[73] Assignee: Mobil Oil Corporation, New York, N.Y.

[22] Filed: Sept. 13, 1973

[21] Appl. No.: 397,039

[52] U.S. Cl............................ 260/668 A, 260/672 T
[51] Int. Cl................................................ C07c 5/24
[58] Field of Search...................... 260/668 A, 672 T

[56] References Cited
UNITED STATES PATENTS

| | | | |
|---|---|---|---|
| 2,795,630 | 6/1957 | Lien et al. | 260/668 R |
| 3,646,236 | 2/1972 | Keith et al. | 260/672 T |
| 3,691,247 | 9/1972 | Billings | 260/668 A |
| 3,751,504 | 8/1973 | Keown et al. | 260/672 T |
| 3,756,942 | 9/1973 | Cattanach | 208/138 |
| 3,761,389 | 9/1973 | Rollmann | 208/64 |
| 3,790,471 | 2/1974 | Argauer et al. | 260/672 T |

Primary Examiner—C. Davis
Attorney, Agent, or Firm—A. L. Gaboriault

[57] ABSTRACT

An improved catalyst for use in Octafining plants is characterized by a zeolite of the ZSM-5 type of zeolite ZSM-12 or zeolite ZSM-21. With substitution of a zeolite catalyst for platinum on silica alumina, the process operates at very high space velocities as calculated with respect to the active zeolite component of the catalyst. Typically the space velocity with respect to zeolite component may be 1 to 200 unit weights of charge per unit weight of zeolite per hour.

10 Claims, 1 Drawing Figure

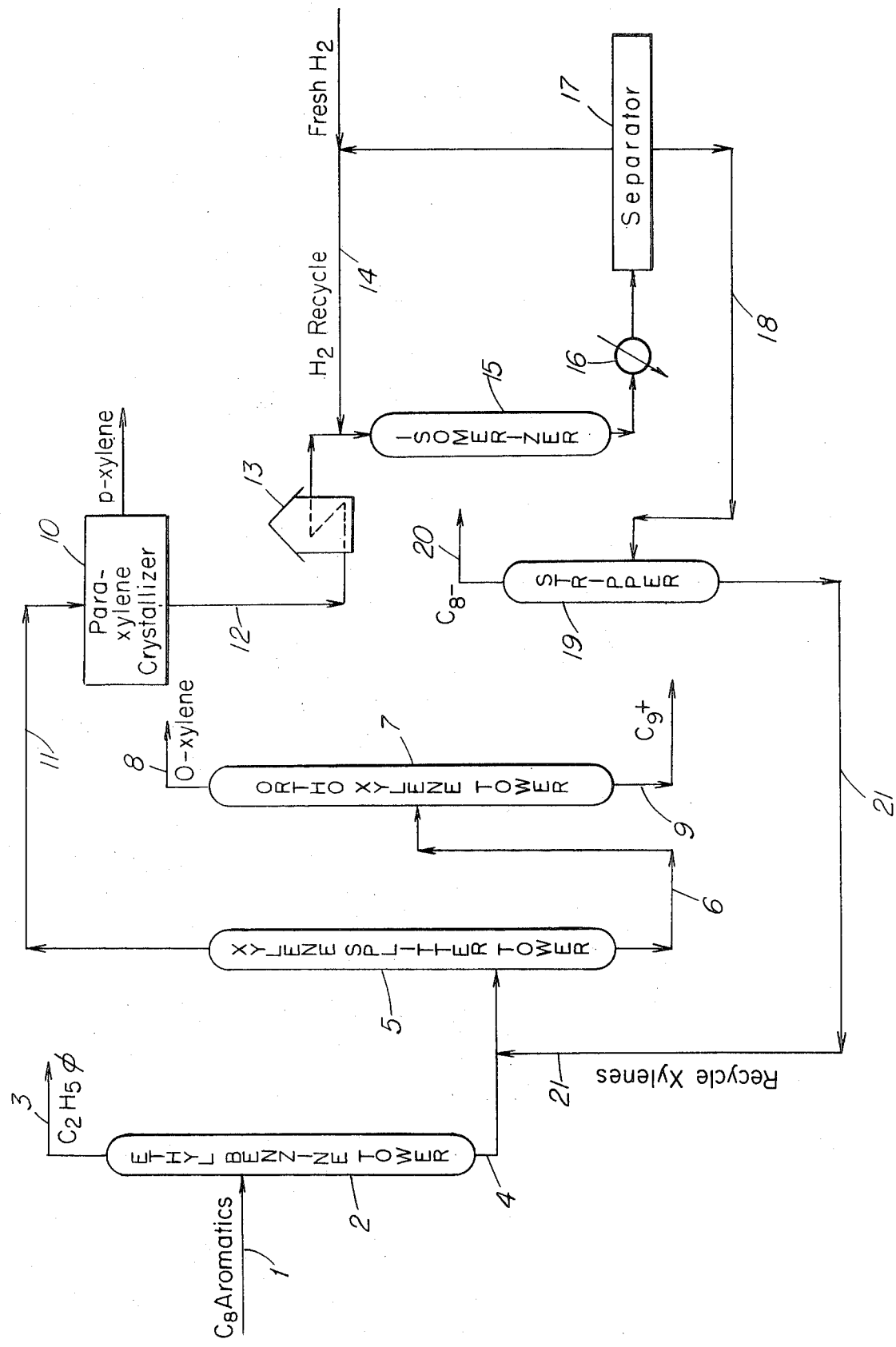

XYLENE ISOMERIZATION

BACKGROUND OF THE INVENTION

Since the announcement of the first commercial installation of Octafining in Japan in June, 1958, this process has been widely installed for the supply of p-xylene. See "Advances in Petroleum Chemistry and Refining" volume 4 page 433 (Interscience Publishers, New York 1961). That demand for p-xylene has increased at remarkable rates, particularly because of the demand for terephthalic acid to be used in the manufacture of polyesters.

Typically, p-xylene is derived from mixtures of $C_8$ aromatics separated from such raw materials as petroleum naphthas, particularly reformates, usually by selective solvent extraction. The $C_8$ aromatics in such mixtures and their properties are:

|  | Freezing Point °F. | Boiling Point °F. | Density Lbs./U.S. Gal. |
|---|---|---|---|
| Ethyl benzene | −139.0 | 277.1 | 7.26 |
| P-xylene | 55.9 | 281.0 | 7.21 |
| M-xylene | −54.2 | 282.4 | 7.23 |
| O-xylene | −13.3 | 292.0 | 7.37 |

Principal sources are catalytically reformed naphthas and pyrolysis distillates. The $C_8$ aromatic fractions from these sources vary quite widely in composition but will usually be in the range 10 to 32 wt.% ethyl benzene with the balance, xylenes, being divided approximately 50 wt.% meta, and 25 wt.% each of para and ortho.

In turn, calculated thermodynamic equilibra for the $C_8$ aromatic isomers at Octafining conditions are:

| Temperature | 850°F. |
|---|---|
| Wt.% Ethyl benzene | 8.5 |
| Wt.% para xylene | 22.0 |
| Wt.% meta xylene | 48.0 |
| Wt.% ortho xylene | 21.5 |
| TOTAL | 100.0 |

An increase in temperature of 50°F. will increase the equilibrium concentration of ethyl benzene by about 1 wt.%, ortho-xylene is not changed and para and meta xylenes are both decreased by about 0.5 wt.%.

Individual isomer products may be separated from the naturally occurring mixtures by appropriate physical methods. Ethyl benzene may be separated by fractional distillation although this is a costly operation. Ortho xylene may be separated by fractional distillation and is so produced commercially. Para xylene is separated from the mixed isomers by fractional crystallization.

As commercial use of para and ortho xylene has increased there has been interest in isomerizing the other $C_8$ aromatics toward an equilibrium mix and thus increasing yields of the desired xylenes.

Octafining process operates in conjunction with the product xylene or xylenes separation processes. A virgin $C_8$ aromatics mixture is fed to such a processing combination in which the residual isomers emerging from the product separation steps are then charged to the isomerizer unit and the effluent isomerizate $C_8$ aromatics are recycled to the product separation steps. The composition of isomerizer feed is then a function of the virgin $C_8$ aromatic feed, the product separation unit performance, and the isomerizer performance.

The isomerizer unit itself is most simply described as a single reactor catalytic reformer. As in reforming, the catalyst contains a small amount of platinum and the reaction is carried out in a hydrogen atmosphere.

Octafiner unit designs recommended by licensors of Octafining usually lie within these specification ranges:

Process Conditions

| Reactor Pressure | 175 to 225 PSIG |
|---|---|
| Reactor Inlet Temperature Range | 830–900°F. |
| Heat of Reaction | Nil |
| Liquid Hourly Space Velocity | 0.6 to 1.6 Vol/Vol/Hr. |
| Number of Reactors, Downflow | 1 |
| Catalyst Bed Depth, Feet | 11 to 15 |
| Catalyst Density, Lb/Cu. Ft. | 38 |
| Recycle Circulation, Mols Hydrogen/Mol Hydrocarbon Feed | 7.0 to 14.0 |
| Maximum Catalyst Pressure Drop, PSI | 20 |

It will be apparent that under recommended design conditions, a considerable volume of hydrogen is introduced with the $C_8$ aromatics. In order to increase throughput, there is great incentive to reduce hydrogen circulation with consequent increase in aging rate of the catalyst. Aging of catalyst occurs through deposition of carbonaceous materials on the catalyst with need to regenerate by burning off the coke when the activity of the catalyst has decreased to an undesirable level. Typically the recommended design operation will be started up at about 850°F. with reaction temperature being increased as needed to maintain desired level of isomerization until reaction temperature reaches about 900°F. At that point the isomerizer is taken off stream and regenerated by burning of the coke deposit.

Actual operation of Octafining varies from the recommended ideal in some cases. In the case of one commercial Octafiner, temperature has been reduced for increased throughput such that a cycle is begun at 760°F. and ended at 860°F. Concurrently, hydrogen recycle is reduced to 6.5 mols of $H_2$ per mol of hydrocarbon charge. Cycle time between regenerations is cut to 3 months at these conditions.

During regeneration, burning proceeds very slowly with diluted oxidizer medium in order to minimize damage to the catalyst. The several days required for regeneration are non-productive and the catalyst after regeneration is at a reduced activity level. For example, an operation at a hydrogen to hydrocarbon recycle ratio of 6.5 results in a cycle life of about 3 months between regenerations with replacement of the catalyst required after about one year, four cycles.

A typical plant for utilization of Octafining is shown in the single FIGURE of the drawings. A mixture of $C_8$ aromatics is introduced by line 1 to an ethyl benzene tower 2 wherein the stream is stripped of a portion of its ethyl benzene content, to an extent consistent with retaining all the xylenes in the feed stream without unduly expensive "superfractionation". Ethyl benzene is taken overhead by line 3 while a bottom stream, consisting principally of xylenes, together with a significant amount of ethyl benzene, passes by line 4 to a xylene splitter column 5. The bottoms from the xylene splitter, constituted by o-xylene and $C_9$ aromatics passes by line 6 to the o-xylene tower 7 from which o-xylene is taken overhead at line 8 and heavy ends are removed by line 9. The overhead from xylene splitter column 5 is transferred to conventional crystallization separation 10 through line 11. The crystallizer operates in the manner described in Machell et al., U.S. Pat. No. 3,662,013 dated May 9, 1972.

Because it's melting point is much higher than that of the other $C_8$ aromatics, p-xylene is readily separated in the crystallizer after refrigeration of the stream and a xylene mixture lean in p-xylene is transferred to an isomerization unit through line 12. The isomerization charge passes through a heater 13, is admixed with hydrogen admitted through line 14 and the mixture is introduced to the reactor 15.

Isomerized product from reactor 15 is cooled in heat exchanger 16 and passed to a high pressure separator 17 from which separated hydrogen can be recycled in the process. The liquid product of the isomerization passes by line 18 to a stripper 19 from which light ends are passed overhead by line 20. The remaining liquid product constituted by $C_8+$ hydrocarbons is recycled in the system by line 21 to the inlet of xylene stripper column 5.

It will be seen that the system is adapted to produce maximum quantities of p-xylene from a mixed $C_8$ aromatic feed containing all of the xylene isomers plus ethyl benzene. The key to efficient operation for that purpose is in the isomerizer which takes crystallizer effluent lean in p-xylene and converts the other xylene isomers in part to p-xylene for further recovery at the crystallizer.

Among the xylene isomerization processes available in the art, Octafining has been unique in its ability to convert ethyl benzene. Other xylene isomerization processes have required extremely epensive fractionation to separate that component of $C_8$ aromatic fractions. As will be seen from the table of properties above, the boiling point of ethyl benzene is very close to those of p- and m-xylene. Complete removal of ethyl benzene from the charge is impractical. The usual expedient for coping with the problem is an ethyl benzene separation column in the isomerizer-separator loop when using catalyst other than those characteristic of Octafining. It will be seen that Octafining does not have this expensive auxiliary to prevent build up of ethyl benzene in the loop. This advantageous feature is possible because the Octafining catalyst converts ethyl benzene.

The Octafining process has been extensively discussed in the literature, for example:

1. Pitts, P. M., Connor, J. E., Leun, L. N., Ind. Eng. Chem., 47, 770 (1955).
2. Fowle, M. J., Bent, R. D., Milner, B. E., presented at the Fourth World Petroleum Congress, Rome, Italy, June 1955.
3. Ciapetta, F. G., U.S. Pat. No. 2,550,531 (1951).
4. Ciapetta, F. G., and Buck, W. H., U.S. Pat. No. 2,589,189.
5. Octafining Process, Process Issue, Petroleum Refinery, 1st Vol. 38 (1959), No. 11, Nov., p.278.

A typical charge to the isomerizing reactor 15 (effluent of crystallizer 10) may contain 17 wt.% ethyl benzene, 65 wt.% m-xylene, 11 wt.% p-xylene and 7 wt.% o-xylene. The thermodynamic equilibrium varies slightly with temperature. The objective in the isomerization reactor 15 is to bring the charge as near to theoretical equilibrium concentrations as may be feasible consistent with reaction times which do not give extensive cracking and disproportionation.

Ethyl benzene reacts through ethyl cyclohexane to dimethyl cyclohexanes which in turn equilibrate to xylenes. Competing reactions are disproportionation of ethyl benzene to benzene and diethyl benzene, hydrocracking of ethyl benzene to ethylene and benzene and hydrocracking of the alkyl cyclohexanes.

The rate of ethyl benzene approach to equilibrium concentration in a $C_8$ aromatic mixture is related to effective contact time. Hydrogen partial pressure has a very significant effect on ethyl benzene approach to equilibrium. Temperature change within the range of Octafining conditions (830° to 900°F.) has but a very small effect on ethyl benzene approach to equilibrium.

Concurrent loss of ethyl benzene to other molecular weight products relates to % approach to equilibrium. Products formed from ethyl benzene include $C_6+$ naphthenes, benzene from cracking, benzene and $C_{10}$ aromatics from disproportionation, and total loss to other than $C_8$ molecular weight. $C_5$ and lighter hydrocarbon by-products are also formed.

The three xylenes isomerize much more selectively than does ethyl benzene, but they do exhibit different rates of isomerization and hence, with different feed composition situations the rates of approach to equilibrium vary considerably.

Loss of xylenes to other molecular weight products varies with contact time. By-products include naphthenes, toluene, $C_9$ aromatics and $C_5$ and lighter hydrocracking products.

Ethyl benzene has been found responsible for a relatively rapid decline in catalyst activity and this effect is proportional to its concentration in a $C_8$ aromatic feed mixture. It has been possible then to relate catalyst stability (or loss in activity) to feed composition (ethyl benzene content and hydrogen recycle ratio) so that for any $C_8$ aromatic feed, desired xylene products can be made with a selected suitably long catalyst use cycle.

The invention provides an improvement in the operation of equipment designed for Octafining by substituting a zeolite catalyst of the ZSM-5 type or a zeolite ZSM-12 catalyst or zeolite ZSM-21 catalyst for the platinum on silica-alumina characteristic of Octafining. Catalysts of the ZSM-5 type include ZSM-5 as described in Argauer and Landolt Pat. No. 3,702,886, dated Nov. 14, 1972, and ZSM-11 as described in Chu Pat. No. 3,709,979 dated Jan. 7, 1973 and variants thereon. Zeolite ZSM-12 is described in German Offenlegungsschrift 2213109.

Preparation of synthetic zeolite ZSM-21 is typically accomplished as follows: A first solution comprising 3.3 g. sodium aluminate (41.8% $Al_2O_3$, 31.6% $Na_2O$ and 24.9% $H_2O$), 87.0 g. $H_2O$ and 0.34 g. NaOH (50% solution with water) was prepared. The organic material pyrrolidine was added to the first solution in 18.2 g. quantity to form a second solution. Thereupon, 82.4 g. colloidal silica (29.5% $SiO_2$ and 70.5% $H_2O$) was added to the second solution and mixed until a homogeneous gel was formed. This gel was composed of the following components in mole ratios:

| | |
|---|---|
| R+/R+ + M' | 0.87, wherein M is sodium and R is the pyrrolidine ion. |
| OH−/SiO₂ | 0.094 (Not including any contribution of OH− from pyrrolidine |
| H₂O/OH− | 210 (Not including any contribution of OH− from pyrrolidine) |
| SiO₂/Al₂O₃ | 30.0 |

The mixture was maintained at 276°C. for 17 days, during which time crystallization was complete. The product crystals were filtered out of solution and water washed for approximately 16 hours on a continuous wash line.

X-ray analysis of the crystalline product proved the crystals to have a diffraction pattern as shown in Table I.

TABLE I

| d (A) | I/Io |
|---|---|
| 9.5 ± 0.30 | Very Strong |
| 7.0 ± 0.20 | Medium |
| 6.6 ± 0.10 | Medium |
| 5.8 ± 0.10 | Weak |
| 4.95 ± 0.10 | Weak |
| 3.98 ± 0.07 | Strong |
| 3.80 ± 0.07 | Strong |
| 3.53 ± 0.06 | Very Strong |
| 3.47 ± 0.05 | Very Strong |
| 3.13 ± 0.05 | Weak |
| 2.92 ± 0.05 | Weak |

Chemical analysis of the crystalline product led to the following compositional figures:

| Composition | Wt.% | Mole Ratio on Al₂O₃ Basis |
|---|---|---|
| N | 1.87 | — |
| Na | 0.25 | — |
| Al₂O₃ | 5.15 | 1.0 |
| SiO₂ | 90.7 | 29.9 |
| N₂O | — | 1.54 |
| Na₂O | — | 0.11 |
| H₂O | — | 9.90 |

Physical analysis of the crystalline product calcined 16 hours at 1000°F. showed it to have a surface area of 304 m²/g and adsorption tests produced the following results:

| Adsorption | Wt. % |
|---|---|
| Cyclohexane | 1.0 |
| n-Hexane | 5.4 |
| Water | 9.0 |

In determining the sorptive capacities, a weighed sample of zeolite was heated to 600°C. and held at that temperature until the evolution of basic nitrogeneous gases ceased. The zeolite was then cooled and the sorption test run at 12 mm for water and 20 mm for hydrocarbons.

Zeolite ZSM-21 is the subject of copending application Ser. No. 358,192, filed May 7, 1973.

These new catalysts are characterized by very good stability as well as very high activity and selectivity in isomerization and other hydrocarbon reactions. By reason of their very good stability and selectivity, they afford longer cycle times between regenerations, even at greatly reduced hydrogen recycle ratios as compared with known Octafining catalyst. These properties result in greatly increased capacity for throughput when these new catalysts are substituted for conventional catalyst in Octafiners.

If ZSM-5 type or ZSM-12 or ZSM-21 catalyst is to be installed in a new plant, it may be preferred that the plant be designed for low temperature liquid phase isomerization as described in Wise Pat. No. 3,377,400 dated Apr. 9, 1968. Alternatively these catalysts may be applied in existing equipment of the Octafiner type by applying the principles of this invention.

To a very large extent, the conditions of reaction are dictated by design of the plant. There is very little capability to vary (process conditions) of an Octafiner except with respect to temperature and space velocity. The present invention contemplates much higher space velocities than those characteristic of Octafining. Temperatures employed in applying the invention may be the same or lower than those recommended for Octafining. Changed space velocity is achieved either by using a part of the reactor space for a partial catalyst fill or by dilution of the catalyst with particles which are inert, e.g., non-acidic alumina. Table II below compares Octafining with operation according to the present invention. Although it is generally preferred to operate the catalyst of this invention at somewhat lower temperatures than those characteristic of Octafining, this comparison is made throughout these experiments, at a constant temperature of 800°F. The first column reports results with Octafining catalyst.

The Octafining data are taken from operation of a commercial Octafiner run at throughput well beyond design capacity. At this level of hydrocarbon charge, capacity of compressors limits the amount of hydrogen to that amount which, added to hydrocarbons charged, equals total capacity of the compressors. By reason of that constraint, the hydrogen to hydrocarbon mol ratio is 6.5. The data here given are "middle of cycle" yields on a cycle which started at 760°F. The second and third columns are operations at difference space velocities in which the catalyst vessel is filled by a mixture of 85 vol.% tabular alumina and 15 vol.% of active catalyst constituted by 65 wt.% NiHZSM-5 in 35% of alumina matrix. The ZSM-5 catalyst was made by ammonium and nickel exchange of 65% ZSM-5 − 35% Al₂O₃ extruded composite in which the ZSM-5 had a silica/alumina ratio of 70. The total catalyst composite of ZSM-5 and alumina contained 0.68 wt.% nickel and 0.05 wt.% sodium. This catalyst (columns 2 and 3) was in particles between 30 and 60 mesh.

The run of the fourth column used one-sixteenth inch extrudate of the ZSM-5 and alumina composite catalyst having the same composition and property as that of the ZSM-5 composite previously described. In this case the vessel was filled with 12.5 vol.% of ZSM-5 composite and 87.5 vol.% of tabular alumina.

The charge employed was that stated above as typical, to wit, ethyl benzene (EB) 17 wt.%, m-xylene (M) 65 wt.%, p-xylene (P) 11 wt.% and o-xylene (O) 7 wt.%. The results of these runs are shown in the following Table II.

TABLE II

COMPARISON WITH OCTAFINING

| Catalyst | Octafining Pt/SiO$_2$/Al$_2$O$_3$ | 15 wt.% NiHZSM-5/Al$_2$O$_3$ 85 wt.% Al$_2$O$_3$ | | 12.5 wt.% NiHZSM-5/Al$_2$O$_3$ 87.5 wt.% Al$_2$O$_3$ |
|---|---|---|---|---|
| Temp | 800°F. | 800°F. | 800°F. | 800°F. |
| WHSV (on zeolite) | 1.6* | 100 | 50 | 12.5 |
| H$_2$/HC Molar | 6.5 | 6.5 | 6.5 | 6.5 |
| Product | | | | |
| EB | 10.8 | 8.2 | 6.0 | 4.5 |
| m-xylene | 46.0 | 44.7 | 42.8 | 40.2 |
| p-xylene | 18.0 | 18.9 | 18.2 | 16.5 |
| o-xylene | 16.7 | 18.8 | 19.6 | 17.8 |
| C$_9$+ | 1.0 | 1.3 | 1.8 | 4.7 |
| Benzene & toluene | 0.75 | 6.3 | 9.2 | 12.0 |
| C$_5$ Paraffins | 6.75 | 1.8 | 2.4 | 4.3 |
| Xylene loss | 3.0 | 1.0 | 3.0 | 6.0 |

*Based on total catalyst (no zeolite).

By examination of the data in Table II it will be seen that the present invention provides capability for increasing the availability of p-xylene and o-xylene at the expense of ethyl benzene and m-xylene. As space velocities approach the space velocities employed in Octafining, - at the temperatures used in Octafining - these advantagaes begin to fall off.

The characterizing feature of the catalyst according to this invention is ZSM-5 type of zeolite as described in said Pat. Nos. 3,702,886, Argauer et al., and 3,709,979, Chu, and ZSM-12 as described in German Offenlegungsschrift 2213109 the disclosures of which are hereby incorporated by reference. The invention also contemplates use of ZSM-21 as hereinabove described. The most active forms for the present purpose are those in which cationic sites are occupied at least in part by protons, sometimes called the "acid form." As described in the Argauer et al., and Chu patents, and the German Offenlegungsschrift the acid form is achieved by burning out the organic cations. Protons may also be introduced by base exchange with ammonium or amine cations and calcination to decompose the ammonium or substituted ammonium cation.

Preferably, the catalyst also includes a metal having hydrogenation capability such as the metals of Group VIII of the Periodic Table. A preferred metal for this purpose is nickel. These metals may be introduced by base exchange or impregnation.

The zeolite is preferably incorporated in a porous matrix to provide mechanical strength, preferably alumina. The hydrogenation metal may be added after incorporation with the zeolite in a matrix, the only essential feature being that metal sites be in the vicinity of the zeolite, preferably within the same particle.

The very high space velocities characteristic of use of ZSM-5 type isomerization catalyst under the design conditions of Octafiners is preferably achieved by dilution with an inert granular solid, such as non-acidic alumina. The separate particles of composite catalyst (ZSM-5 in an alumina matrix) and diluent solids can be prepared by the usual techniques of mixing solids. Alternatively the proportion of matrix may be increased to achieve the desired dilution.

Another technique for achieving high space velocities is to provide a thin bed of composite catalyst across the reactor, preferably with beds of inert material above and below the catalyst to promote uniform flow.

Temperatures for the catalyst used according to this invention may vary depending upon design factors of the equipment. Generally these lie between 550°F. and 900°F. Pressures will also be dictated, at least in part, by design factors of the equipment and may vary from 150 to 300 lb. per square inch gauge.

In this connection, it is noted that the lower temperature limit is related to character of the hydrogenation metal, if any, on the catalyst. Octafining reuires a metal of the platinum group. These are very potent hydrogenation catalysts. At temperatures much below 800°F., hydrogenation of the ring destroys greater amounts of product, the more the temperature is reduced. At the higher temperatures, thermodynamic equilibria favor the benzene ring. The present catalysts are effective with such metals as nickel which give negligible ring hydrogenation at the lower temperatures here possible. In general, it is preferred to use less potent metal catalysts in this invention to afford temperature flexibility with consequent capability for high throughput.

Space velocities are calculated with respect to the active component of ZSM-5 type or ZSM-12 or ZSM-21 zeolite. For example a composite of 65% ZSM-5 and 35% alumina may be admixed with 5 to 10 times as much inert diluent. In a typical example 15 wt.% of composite catalyst and 85 wt.% of inert alumina actually involves about 10% of active material in the whole volume. Space velocities are calculated with respect to that 10% constituted by active component. So calculated, the space velocities may vary from about 1 to about 200 on a weight basis.

Severity of the reaction is a factor of both temperature and space velocity. Excessive severity will result in undue cracking of the charge and the two factors should be adjusted in relationship to each other. Thus space velocities in the lower part of the preferred range will indicate lower temperatures of reaction.

The effects of the several variables will be apparent from examples presented below in tubular form.

Table III reports a number of examples in which the catalyst was 65% nickel acid ZSM-5 in an alumina matrix. This was admixed in the proportion of 15 wt.% of the composite and 85 wt.% of tabular alumina. Space velocities are reported with respect to the zeolite only in each case. The specified charge was admixed with hydrogen in the molar proportions shown by the value given for H$_2$/HC. Yields of products and by-products are shown in the Table. In each case, yields are supplied for products on two bases. The yield on total charge is reported. Also each product is reported as a percentage of C$_8$ aromatics in the product, thus permitting comparison against the equilibrium mixture.

TABLE III $C_8$ Aromatics Isomerization NiHZSM-5 Catalyst
Charge, wt.%: 17.1 EB, 11.0 p-xyl, 65.4 m-xyl, 6.8 o-xyl

| Example | 1 | | 2 | | 3 | | 4 | | 5 | | 6 | |
|---|---|---|---|---|---|---|---|---|---|---|---|---|
| Temp., °F. | 801 | | 800 | | 797 | | 800 | | 700 | | 725 | |
| Pressure, PSIG | 205 | | 210 | | 210 | | 200 | | 200 | | 200 | |
| WHSV (on zeolite) | 100 | | 200 | | 200 | | 50 | | 50 | | 50 | |
| $H_2$/HC | 6.5 | | 6.5 | | 6.5 | | 6.5 | | 6.5 | | 6.5 | |
| Time On Stream, hrs. | 18.3 | | 22.3 | | 45.8 | | 50.1 | | 4.2 | | 23.1 | |
| Material Balance | 94.7 | | 96.6 | | 100.3 | | 100.5 | | 99.9 | | 99.6 | |
| Product Distribution wt.% | | | | | | | | | | | | |
| $C_2$ | 1.5 | | 1.0 | | 0.7 | | 2.0 | | 0.2 | | 0.3 | |
| $C_2$= | 0.2 | | 0.3 | | 0.4 | | 0.1 | | 0.1 | | 0.2 | |
| $C_3$ | 0.1 | | 0.1 | | 0.1 | | 0.3 | | 0.1 | | 0.1 | |
| i-$C_4$ | 0.01 | | — | | — | | — | | — | | — | |
| n-$C_4$ | 0.01 | | 0.005 | | — | | — | | — | | — | |
| $C_6H_6$ | 5.7 | | 4.3 | | 3.6 | | 7.6 | | 2.3 | | 4.0 | |
| Toluene | 0.6 | | 0.3 | | 0.3 | | 1.6 | | 0.1 | | 0.7 | |
| $C_8$ Aromatics on total and on $C_8$aromatics | Total | $C_8$Ar | Total | $C_8$Ar | Total | $C_8$Ar | Total | $C_8$Ar | Total | $C_8$Ar | Total | $C_8$Ar |
| EB | 8.2 | 9.1 | 10.0 | 10.8 | 10.6 | 11.3 | 6.0 | 7.0 | 12.4 | 12.9 | 10.7 | 11.4 |
| m-xylene | 44.7 | 49.3 | 46.5 | 50.1 | 42.2 | 50.2 | 42.8 | 49.4 | 45.5 | 47.5 | 45.5 | 48.1 |
| p-xylene | 18.9 | 20.9 | 19.6 | 21.1 | 19.9 | 21.1 | 18.2 | 21.0 | 19.2 | 20.0 | 18.8 | 19.9 |
| o-xylene | 12.2 | 20.7 | 16.7 | 18.0 | 16.4 | 17.4 | 19.6 | 22.6 | 18.9 | 19.7 | 19.5 | 20.6 |
| $C_9$ Aromatics | 1.3 | | 1.1 | | 0.8 | | 1.8 | | 1.6 | | 4.4 | |
| Wt.% conversion to non-aromatics | 1.8 | | 1.4 | | 1.2 | | 2.4 | | 0.4 | | 0.6 | |
| Wt.% loss $C_8$ aromatics | 9.4 | | 7.2 | | 5.9 | | 13.4 | | 4.5 | | 5.5 | |

The examples reported in Table IV below are on a similar basis with the same catalyst mixture and a different charge.

TABLE IV $C_8$ Aromatics Isomerization NiHZSM-5 Catalyst
Charge, wt.%: 17.2 EB, 10.7 p-xyl, 65.6 m-xyl, 6.5 o-oxyl

| Example | | 7 | | 8 |
|---|---|---|---|---|
| Temp., °F. | | 600 | | 500 |
| Pressure, PSIG | | 205 | | 200 |
| WHSV (on zeolite) | | 2.19 | | 2 |
| $H_2$/HC | | 6.5 | | 6.5 |
| Time On Stream, Hrs. | | 2.3 | | 5.1 |
| Material Balance | | 100.7 | | 100.0 |
| Product Distribution wt.% | | | | |
| $C_1$ | | 1.3 | | — |
| $C_2$ | | — | | 0.1 |
| $C_3$ | | 1.0 | | 0.1 |
| i-$C_4$ | | 0.2 | | — |
| n-$C_4$ | | 0.2 | | — |
| i-$C_5$ | | 0.1 | | — |
| $C_6H_6$ | | 3.0 | | 0.1 |
| $C_7$ (alkyl) | | — | | 0.1 |
| Toluene | | 2.1 | | |
| $C_8$ (alkyl) | | 0.2 | | 4.8 |
| $C_8$ Aromatics on total and on $C_8$ aromatics | Total | $C_8$ Ar | Total | $C_8$ Ar |
| EB | 9.7 | 10.9 | 14.9 | 15.7 |
| m-xylene | 43.5 | 48.6 | 47.0 | 49.6 |
| p-xylene | 18.6 | 20.7 | 19.8 | 20.9 |
| o-xylene | 17.8 | 19.8 | 13.3 | 13.9 |
| $C_9$ Aromatics | | 2.3 | | — |
| Wt.% Conversion to non-aromatics | | 3.0 | | 5.1 |
| Wt.% loss $C_8$ aromatics | | 10.4 | | 5.2 |

EXAMPLE 9

The catalyst employed in this example was zeolite ZSM-12 impregnated with 0.5 wt.% platinum. The catalyst was prepared from ZSM-12 of 97.5 silica/alumina ratio by base exchange with ammonium nitrate. The zeolite was contacted with 1N ammonium nitrate solution at room temperature for 1 hour. The zeolite was then drained and contacted with a fresh solution of ammonium nitrate at room temperature for 1 hour. This ammonium form of zeolite ZSM-12 was dried at 230°F., pelleted and sized to 30–60 mesh. The pellets were calcined in air at 1000°F.

A portion of the calcined pellets in the amount of 5.34 grams was then impregnated with platinum by emersion in a solution of 0.75 grams of chloropitinic acid in 25 grams of water. The zeolite was allowed to remain in contact with the solution for 5 minutes then drained by vacuum on a Buchner funnel. The impregnated pellets were calcined at 1000°F., for 8 hours.

A charge consisting of 17.2 wt.% ethyl benzene, 10.7 wt.% p-xylene, 65.6 wt.% m-xylene and 6.5 wt.% o-xylene was reacted over a mixture of 3.1 wt.% of the composite PtZSM-12/matrix catalyst mixed with 96.9 wt.% of tabular alumina at 700°F. and 200 p.s.i.g. pressure. Hydrogen was admixed with the charge in a molar ratio of 6.5 $H_2$ per mol of hydrocarbon. Space velocity was 50 unit weights of hydrocarbon per unit weight of PtZSM-12. In a run of 4 hours duration, products were collected and analyzed. Material balance was 99.5%.

The product of reaction included traces of propane, isobutane and n-butane. Other components of the effluent were:

TABLE V

| COMPONENT | WT.% OF TOTAL | WT.% OF $C_8$ AROMATICS |
|---|---|---|
| Benzene | 0.1 | — |

TABLE V-Continued

| COMPONENT | WT.% OF TOTAL | WT.% OF $C_8$ AROMATICS |
|---|---|---|
| Cyclohexane | 0.1 | — |
| Toluene | 3.7 | — |
| $C_8$ Alkanes | 4.0 | — |
| Ethyl benzene | 10.2 | 11.5 |
| m-xylene | 41.9 | 47.6 |
| p-xylene | 18.6 | 21.1 |
| o-xylene | 17.4 | 19.7 |
| $C_9$ Aromatic | 3.9 | — |

The results show 11.8 wt.% loss of $C_8$ aromatics; 4.1 wt.% conversion to non-aromatic products.

EXAMPLE 10

A catalyst NiHZSM-21 was prepared by mixing in the manner hereinafter described of three separate ingredients designated A, B and C:

| A. | $NaAlO_2$ | 33.0 gm. |
| | 50% NaOH soln. | 3.4 gm. |
| | $H_2O$ | 870 gm. |
| B. | Colloidal $SiO_2$ | 824 gm. |
| C. | Pyrrolidine | 182 gm. |

Ingredient C was added to solution A. Ingredient B was added to that composite and the whole was stirred for 20 minutes. The mixture was allowed to crystallize in a stirred autoclave at 270°F. for 17 days. Solids were separated by filtration and dried at 230°F., then calcined at 1000°F. in air.

A sample of 50 grams of the solid so obtained was contacted with 950 ml of 5% ammonium chloride at 210°F. for 1 hour. That contact was repeated for a total of 5 times with fresh ammonium chloride solution without stirring. Thirty grams of the resultant $NH_4$ ZSM-21 were placed in 30 ml of 0.5N nickel nitrate for one contact of 4 hours at 190°F. with stirring. The resultant material was dried at 230°F. for 17 hours sized to 30-60 mesh and calcined 10 hours at 1000°F.

The same charge as that described in Example 9 was reacted over a mixture of 3.1 wt.% NiHZSM-21 and 96.9 wt.% tabular alumina at 700°F., 200 p.s.i.g., 50 WHSV and hydrogen to hydrocarbon ratio of 6.5. A 4 hour run was made at a material balance of 99.4%. Gaseous products included 0.3 wt.% ethane, 0.01 wt.% ethylene and 0.05 wt.% propane. Other products are shown in Table VI.

TABLE VI

| | WT.% OF TOTAL | WT.% OF $C_8$ AROMATICS |
|---|---|---|
| Benzene | 1.1 | — |
| Toluene | 0.5 | — |
| Ethyl benzene | 14.7 | 15.1 |
| m-xylene | 44.0 | 45.1 |
| p-xylene | 20.9 | 21.2 |
| o-xylene | 18.0 | 18.4 |
| $C_9$ aromatics | 0.6 | — |

Weight percent conversion to non-aromatics was 0.4; loss of $C_8$ aromatics was 2.5 wt.%.

From the data presented and general conclusions reviewed it will be seen that substitution of ZSM-5 type catalyst for Octafining catalyst or of ZSM-12 or ZSM-21 catalyst provides advantages as follows:

1. The rate of catalyst aging is reduced.
2. The proportion of time on regeneration is reduced because frequency of regeneration is less; longer on-stream periods.
3. Lower hydrogen to hydrocarbon ratios are permitted.
4. Greater throughput is achieved per unit volume of reactor.
5. Greater temperature flexibility is afforded.

I claim:

1. A new use of the known apparatus for simultaneously isomerizing xylenes and converting ethyl benzene to products readily separable by distillation from the mixture of $C_8$ aromatics by contacting a mixture of $C_8$ aromatics and hydrogen with a platinum on silica-alumina catalyst at pressure of 175 to 225 pounds per square inch, a temperature of 830 to 900°F. and liquid hourly space velocity of 0.6 to 1.6 liquid volumes of hydrocarbon per volume of catalyst per hour in a loop comprising an isomerization reactor for the contact aforesaid, distillation means for separating $C_8$ aromatics from lower boiling and higher boiling hydrocarbons, means to transfer hydrocarbon effluent of said isomerization reactor to said distillation means, mixing means for mixing fresh feed $C_8$ aromatics containing xylenes and ethyl benzene with $C_8$ aromatics separated by distillation means, a xylene separator for recovery of para xylene, means for transfer of mixed $C_8$ aromatics from said mixing means to said xylene separator, and means to transfer $C_8$ aromatics lean in para xylene from said xylene separator to said isomerization reactor; which new use comprises contacting, in the isomerization reactor of said known apparatus, a vapor phase mixture of hydrogen and said $C_8$ aromatics lean in para xylene with a zeolite catalyst of the ZSM-5 type or zeolite ZSM-12 or zeolite ZSM-21 at a temperature of 550 to 900°F., a pressure of 150 to 300 pounds per square inch and a weight hourly space velocity with respect to said zeolite alone between about 1 and about 200.

2. The new use defined by claim 1 wherein said zeolite is in the acid form.

3. The new use defined by claim 1 wherein a metal of Group VIII or a compound of such metal is associated with said zeolite.

4. The new use defined by claim 1 wherein said zeolite is dispersed in a solid matrix.

5. The new use defined by claim 4 wherein the composite of zeolite and matrix is admixed with a greater volume of discrete particles of an inert, solid diluent.

6. A process for the isomerization of xylenes in a mixture of xylenes with ethyl benzene which comprises contacting a $C_8$ aromatic fraction containing both xylenes and ethyl benzene in vapor phase admixed with hydrogen with a zeolite catalyst of the ZSM-5 type or zeolite ZSM-12 or zeolite ZSM-21 at a temperature of 550° to 900°F., a pressure of 150 to 300 pounds per square inch and a weight hourly space velocity with respect to said zeolite alone betwen 1 and about 200.

7. The process defined by claim 6 wherein said zeolite is in the acid form.

8. The process defined by claim 6 wherein a metal of Group VIII or a compound of such metal is associated with zeolite.

9. The process defined by claim 6 wherein said zeolite is dispersed in a solid porous matrix.

10. The process defined by claim 9 wherein the composite of zeolite and matrix is admixed with a greater volume of discrete particles in an inert solid diluent.

* * * * *